(12) United States Patent
Thijssen et al.

(10) Patent No.: US 7,565,458 B2
(45) Date of Patent: Jul. 21, 2009

(54) CELL PHONE ACCESSORY IDENTIFICATION ALGORITHM BY GENERATING AND MEASURING A VOLTAGE PULSE THROUGH A PIN INTERFACE

(75) Inventors: Jeroen Thijssen, Bara (SE); Håkan Ohlgren, Haninge (SE)

(73) Assignee: Sony Ericsson Mobile Communications AB (SE)

( * ) Notice: Subject to any disclaimer, the term of this patent is extended or adjusted under 35 U.S.C. 154(b) by 452 days.

(21) Appl. No.: 10/582,253

(22) PCT Filed: Nov. 29, 2004

(86) PCT No.: PCT/EP2004/053149

§ 371 (c)(1),
(2), (4) Date: Jun. 9, 2006

(87) PCT Pub. No.: WO2005/060224

PCT Pub. Date: Jun. 30, 2005

(65) Prior Publication Data

US 2007/0082634 A1    Apr. 12, 2007

Related U.S. Application Data

(60) Provisional application No. 60/530,311, filed on Dec. 17, 2003.

(30) Foreign Application Priority Data

Dec. 12, 2003    (EP)    ................... 03445142

(51) Int. Cl.
H04B 1/18    (2006.01)
G06F 13/00    (2006.01)

(52) U.S. Cl. .................... 710/16; 710/8; 710/9; 710/10; 710/15; 710/17; 710/18; 710/19; 455/553.1; 455/557; 455/169.1

(58) Field of Classification Search ............... 710/8–10, 710/15–19; 445/557, 553.1; 455/169.1, 455/557, 553.1
See application file for complete search history.

(56) References Cited

U.S. PATENT DOCUMENTS 5,301,360 A    4/1994    Goldberg (Continued)

FOREIGN PATENT DOCUMENTS

EP    0 861 008 A1    8/1998

(Continued)

OTHER PUBLICATIONS

International Search Report and Written Opinion for PCT/EP2004/053149; date of mailing Mar. 30, 2005.

(Continued)

Primary Examiner—Tammara Peyton
(74) Attorney, Agent, or Firm—Myers Bigel Sibley & Sajovec, P.A.

(57) ABSTRACT

In some embodiments, a method is provided for identifying a communication interface of an electronic unit attached to a connector of an electronic device. A voltage pulse is generated in the device on a pin of the connector. The voltage on the pin is measured, as it is affected by a load in the unit. The measured voltage is compared with predetermined voltage criteria. Communication interface identification is performed on the unit dependent on the comparison.

36 Claims, 7 Drawing Sheets

U.S. PATENT DOCUMENTS

| | | | |
|---|---|---|---|
| 5,859,522 A | 1/1999 | Theobald | |
| 6,194,866 B1* | 2/2001 | Olsson | 320/106 |
| 6,195,562 B1* | 2/2001 | Pirhonen et al. | 455/553.1 |
| 6,725,061 B1* | 4/2004 | Hutchison et al. | 455/557 |
| 2003/0148787 A1* | 8/2003 | Hao | 455/557 |

FOREIGN PATENT DOCUMENTS

| | | |
|---|---|---|
| EP | 1 467 285 A1 | 10/2004 |
| EP | 1 473 843 A1 | 11/2004 |
| RU | 2 108 003 C1 | 3/1998 |
| WO | WO00/42797 A | 7/2000 |
| WO | WO 03/060732 A1 | 7/2003 |

OTHER PUBLICATIONS

European Search Report, Application No. EP 08 15 2098, Mar. 20, 2008.

* cited by examiner

CELL PHONE ACCESSORY IDENTIFICATION ALGORITHM BY GENERATING AND MEASURING A VOLTAGE PULSE THROUGH A PIN INTERFACE

RELATED APPLICATIONS

The present application is a 35 U.S.C. §371 national phase application of PCT International Application No. PCT/EP2004/053149, having an international filing date of Nov. 29, 2004 and claiming priority to European Patent Application No. 03445142.7, filed Dec. 12, 2003 and U.S. Provisional Application No. 60/530,311 filed Dec. 17, 2003, the disclosures of which are incorporated herein by reference in their entireties. The above PCT International Application was published in the English language and has International Publication No. WO 2005/060224 A1.

FIELD OF THE INVENTION

The present invention relates generally to radio communication terminals having an interface comprising a system connector, at which accessories to the terminal are connectable.

BACKGROUND

The first commercially attractive cellular telephones or terminals were introduced in the market at the end of the 1980's. Since then, a lot of effort has been made in making smaller terminals, with much help from the miniaturisation of electronic components and the development of more efficient batteries. Today, numerous manufacturers offer pocket-sized terminals with a wide variety of capabilities and services, such as packet-oriented transmission and multiple radio band coverage.

In order to attract customers the terminal manufacturers have therefore taken further measures to strengthen their position in the competition, one such being to offer different types of accessories for the terminals. Such accessories include auxiliary keyboards, media players, headsets and battery chargers. Each of these accessories may be connectable to separate sockets of the terminal, provided for each particular purpose. However, in many cases the terminal includes a system connector to which several different types of accessories may be connected. For this reason, the terminal needs to be capable of identifying which type of accessory is connected.

In a prior art solution, applied in the Ericsson® T28 terminal series, the 3 volt system connector made use of break signals for data communication, and portable hands free sense, as the only passive accessory detection possibility.

SUMMARY OF THE INVENTION

A general object of the present invention is to provide a solution for meeting the market demands for self-controlled identification of communication interfaces when electronic apparatuses are interconnected. In particular, such a solution is desirable for implementation in compact communication terminals which are capable of operating with several types of accessories.

An aspect of this object is to provide a solution for handling more functions on fewer pins of the system connector.

Another aspect is to provide a solution for a system connector which is able to use the same pins for different types of communication interfaces.

Yet another aspect of the general object is to provide a solution for identifying passive, non-microprocessor controlled accessories.

According to a first aspect, these objects are fulfilled by a method for identifying a communication interface of an electronic unit attached to a connector of an electronic device, comprising the steps of:
  generating a voltage pulse in said device on a pin of said connector;
  measuring the voltage on said pin, as affected by a load in said unit;
  comparing the measured voltage with predetermined voltage criteria; and
  performing communication interface identification of said unit dependent on said comparison.

Preferably, said step of performing identification is preceded by the step of:
  selecting identification process dependent on the value of said measured voltage. Additionally, said step of performing identification may also be preceded by the step of:
  selecting identification process dependent on predetermined timing criteria.

In one embodiment, said step of performing identification comprises the steps of:
  measuring dynamic behaviour of said voltage level; and
  allotting an identification address to said unit dependent on said dynamic behaviour.

Preferably, said step of measuring dynamic behaviour comprises the steps of:
  measuring a time period during which said voltage holds a stable level; and
  measuring the value of said stable voltage level.

In such an embodiment, said identification address is advantageously determined by the length of said time period and the magnitude of said voltage level value.

Preferably, said identification address comprises two nibbles, one address nibble being selected dependent the length of said time period and one other nibble being selected dependent on the magnitude of said voltage level value.

Said identification address is advantageously a two nibble hexadecimal number which is set dependent on predetermined time and voltage ranges.

Preferably, a predetermined number is selected for said one address nibble if the length of said time period exceeds a predetermined maximum time period.

In one embodiment, the method comprises the step of:
  monitoring an attachment control bus of said electronic device for a predetermined time period, dependent on if said measured voltage level meets predetermined criteria for digital attachable units.

Preferably, said predetermined criteria for digital attachable units is a maximum threshold voltage level.

In the event of data communication being detected over said attachment control bus during said time period, the method preferably comprises the step of:
  performing digital identification of said unit.

Furthermore, in the event of no data communication being detected over said attachment control bus during said time period, the method preferably comprises the step of:
  allotting an identification address comprising two nibbles to said unit, one address nibble for which a predetermined number is selected, and one other nibble for which a number is selected dependent on the magnitude of said voltage level value.

In a preferred embodiment, the method comprises the step of:
repeatedly generating said voltage pulse with a predetermined frequency.

In an alternative embodiment, the method comprises the steps of:
repeatedly generating said voltage pulse with a predetermined repetition frequency characteristic; and
adapting said repetition frequency to a mode of operation for said connector, by applying a first repetition frequency in an idle mode for said connector; and by applying a second repetition frequency, higher than said first repetition frequency, in an active mode for said connector, with an attached unit.

In one embodiment, wherein said step of performing identification includes the step of allotting the unit an identification address, the method further comprises the step of:
accessing a data memory using said identification address for retrieving operational data associated with said unit
Said data memory may be located in said electronic device.
Alternatively, said data memory may be located in said electronic unit.

In yet another alternative embodiment, the method comprises the steps of:
establishing a connection over a communication network for accessing said memory; and
downloading operational data relating to said unit to said electronic device.
Preferably, such an embodiment comprises the step of:
making adjustments dependent on the attached electronic unit to said electronic device, based on said operational data.

In a preferred embodiment, said electronic device is a radio communication terminal, and said electronic unit is an accessory which is attachable to said radio communication terminal.

In one embodiment, said identity is representative of a class of electronic units.

In an alternative embodiment, said identity is unique for said electronic unit.

According to a second aspect, the stated objects are fulfilled by a computer program product, comprising computer program code stored in memory means, which is executable by means of a micro processor in an electronic device for performing the steps according to any of the previous method steps.

According to a third aspect, the stated objects are fulfilled by an electronic unit having a communication interface comprising a first connector attachable to a system connector of an electronic device, wherein said communication interface comprises an electronic circuit connected to said first connector, which electronic circuit constitutes an electric load which is selected to represent an identity for said communication interface.

In one embodiment, said circuit comprises a resistive component, wherein said identity is dependent on the ohmic resistance of said resistive component.

In an alternative or optional embodiment, said circuit comprises a capacitive component, wherein said identity is dependent on the dynamics of said circuit.

Preferably, said circuit is devised to generate a dynamic load, when subjected to a voltage from an attached electronic device, which load holds a substantially stable voltage level over said connector for a predetermined time period, and then triggers said voltage to rise.

Advantageously, said identity is determined by the duration of said predetermined time period and said voltage level.

In one embodiment, said electronic unit comprises a second connector to which said circuit is connected, to which second connector an additional electronic unit electronic unit may be cascadably attached.

In an exemplary embodiment, said electronic unit is an accessory which is attachable to an electronic device in the form of a radio communication terminal.

In one embodiment, said identity is representative of a class of electronic units.

In an alternative embodiment, said identity is unique for said electronic unit.

According to a fourth aspect, the stated objects are fulfilled by an electronic circuit, for use in an electronic unit having a first connector attachable to a system connector of an electronic device, wherein said circuit is devised to generate a dynamic load when subjected to a voltage from an attached electronic device, which load is representative of the identity of a communication interface of said electronic unit.

In one embodiment, said circuit comprises a transistor, a resistive component, and an RC component, wherein said transistor controls current from the electronic device to the resistive component which initially generates a substantially stable voltage level for a predetermined time period, where after said RC circuit triggers said voltage to rise.

In a preferred embodiment, said time period is dependent on the characteristics of said transistor, and in that said transistor is contained on an ASIC.

BRIEF DESCRIPTION OF THE DRAWINGS

The features and advantages of the present invention will be more apparent from the following description of the preferred embodiments with reference to the accompanying drawings, on which FIG. 1 schematically illustrates an electronic device in the form of a communication terminal, with which an accessory identification algorithm according to the present invention may be used, and also a portable hands free accessory as an exemplary accessory.

Figure 1:
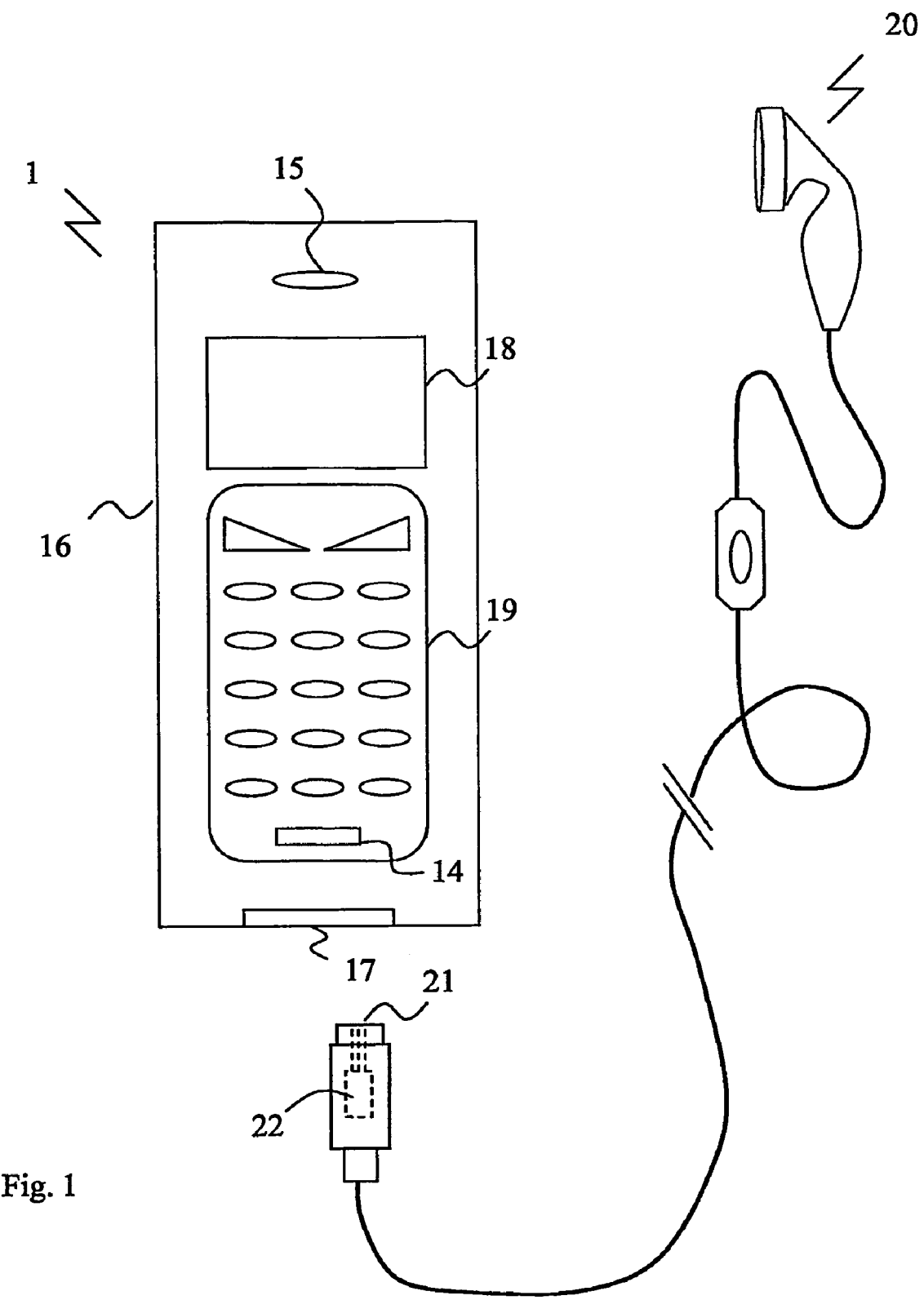

| Acronyms and Abbreviations | |
|---|---|
| ACB | Accessory Control Bus |
| AID | Accessory Identification |
| EMP | Ericsson Multiplex Protocol |
| DCIO | Digital Current In Out |
| LSN | Least Significant Nibble |
| MSN | Most Significant Nibble |
| Nibble | 4 bits of 1 byte |
| PHF | Portable Hands Free |
| SPHF | Stereo Portable Hands Free |
| FMS | From Mobile Station |
| TMS | To Mobile Station |
| TA | To Accessory |
| FA | From Accessory |
| UART | Universal Asynchronous Receiver Transmitter |
| USB | Universal Serial Bus |

DETAILED DESCRIPTION OF PREFERRED EMBODIMENTS

The present description relates to the field of identification of mutually connectable electronic devices, and in particular to accessory identification for radio communication terminals. The term radio terminal or communication terminal, also denoted terminal in short in this disclosure, includes all mobile equipment devised for radio communication with a radio station, which radio station also may be mobile terminal or e.g. a stationary base station. Consequently, the term radio terminal includes mobile telephones, pagers, communicators, electronic organisers, smartphones, PDA:s (Personal Digital Assistants) and DECT terminals (Digital Enhanced Cordless Telephony).

Furthermore, the invention is as such applicable to numerous types of electronic devices which are attachable to each other, by means of a cord or directly attaching connector means, not only communication terminals. Embodiments of the invention therefore also include e.g. home electronics, video cameras connectable to hi-fi equipment or television sets for transmission of audio or video signals, computer accessories such as a mouse, keyboard, smart card reader etc, connectable to personal computers, and so on. Hence, although the structure and characteristics of the terminal according to the invention is mainly described herein, by way of example, in the implementation in a mobile phone, this is not to be interpreted as excluding implementation in other types of radio terminals, such as those listed above.

Also, the illustrated embodiments relate to an accessory attached to a terminal, whereas the inventive idea for identification is applicable between different types of electronic apparatuses having equal or different status, in the sense that it may not be appropriate to refer to one as an accessory to the other. Therefore, in particular in the appended claims, a first electronic apparatus is referred to as an electronic device, whereas a second electronic apparatus, releaseably attached to the electronic device, is referred to as an electronic unit. The terminology of device and unit is selected merely for the sake of convenience in order to separate the two, and no hierarchical relation or difference in complexity is necessarily involved.

Furthermore, it should be emphasised that the term comprising or comprises, when used in this description and in the appended claims to indicate included features, elements or steps, is in no way to be interpreted as excluding the presence of other features elements or steps than those expressly stated.

Exemplary embodiments will now be described with references made to the accompanying drawings.

For the sake of reference to means for implementation of the present invention, FIG. 1 illustrates the front face of an electronic device, in this exemplary case a typical radio communication terminal 1 in the form of a cellular phone. Terminal 1 is carried in by a support structure 16, including a chassis and a cover, directly or indirectly supporting the other components of the terminal. Terminal 1 is devised with a user-input interface, in the displayed embodiment comprising a microphone 14 and a keypad 19. The user input interface may also or comprise a touch-sensitive display in addition to or instead of the keypad 19. Furthermore, a user output interface of the terminal 1 comprises a loudspeaker 15 and a display 18. All of these features are well known in the prior art. Though not shown in FIG. 1, the terminal 1 further includes an antenna, radio transmission and reception electronics, and a power supply preferably in the form of a battery. Terminal 1 is also devised with a computer system, including a microprocessor with associated memory and software. In order to make use of and communicate with other electronic units, such as other terminals or various types of accessories, e.g. a charger or a PHF, the terminal 1 is further devised with a system connector 17. FIG. 1 further illustrates an exemplary releaseably attachable electronic unit in the form of a PHF accessory 20, which is connectable to system connector 17 by means of a PHF connector 21. Electronic unit 20 further includes an electronic circuit 22, various embodiments of which will be described in detail below.

The identification of a communication interface of an attached electronic unit serves as an ignition key to start the system bus of the terminal in the right mode. Such identification of a communication interface will mainly be referred to herein as accessory identification. The terminal needs to detect and identify which type of accessory that is connected before starting communication with the same, or initiating audio paths. In accordance with the invention, accessory identification is performed on one pre-selected pin or pad of the system connector, herein denoted the AID pin.

In a preferred embodiment, the system connector is devised to assume the following states or modes:
  Idle/Detection
  Identification
  Active
  Detach
  Return to Idle In idle mode the system bus is devised to perform two things:
  Check for voltage on DCIO; and
  Check for accessory device on AID pin.

When voltage is detected on DCIO, a check for an accessory device on the AID pin is performed to ensure that the accessory connected is not a USB host accessory. The check for accessory device on the AID pin is performed with an Accessory Identification Algorithm in accordance with the invention, which offers a possibility to identify a number of accessories before starting communication or initiating audio paths and audio parameters. These accessory identities can be used to identify which data Interface the accessory is using, and a limited number of accessory types which will not have data interfaces to identify themselves, such as PHF, SPHF, simple desk-stands and simple VHF cradles.

Figure 2:
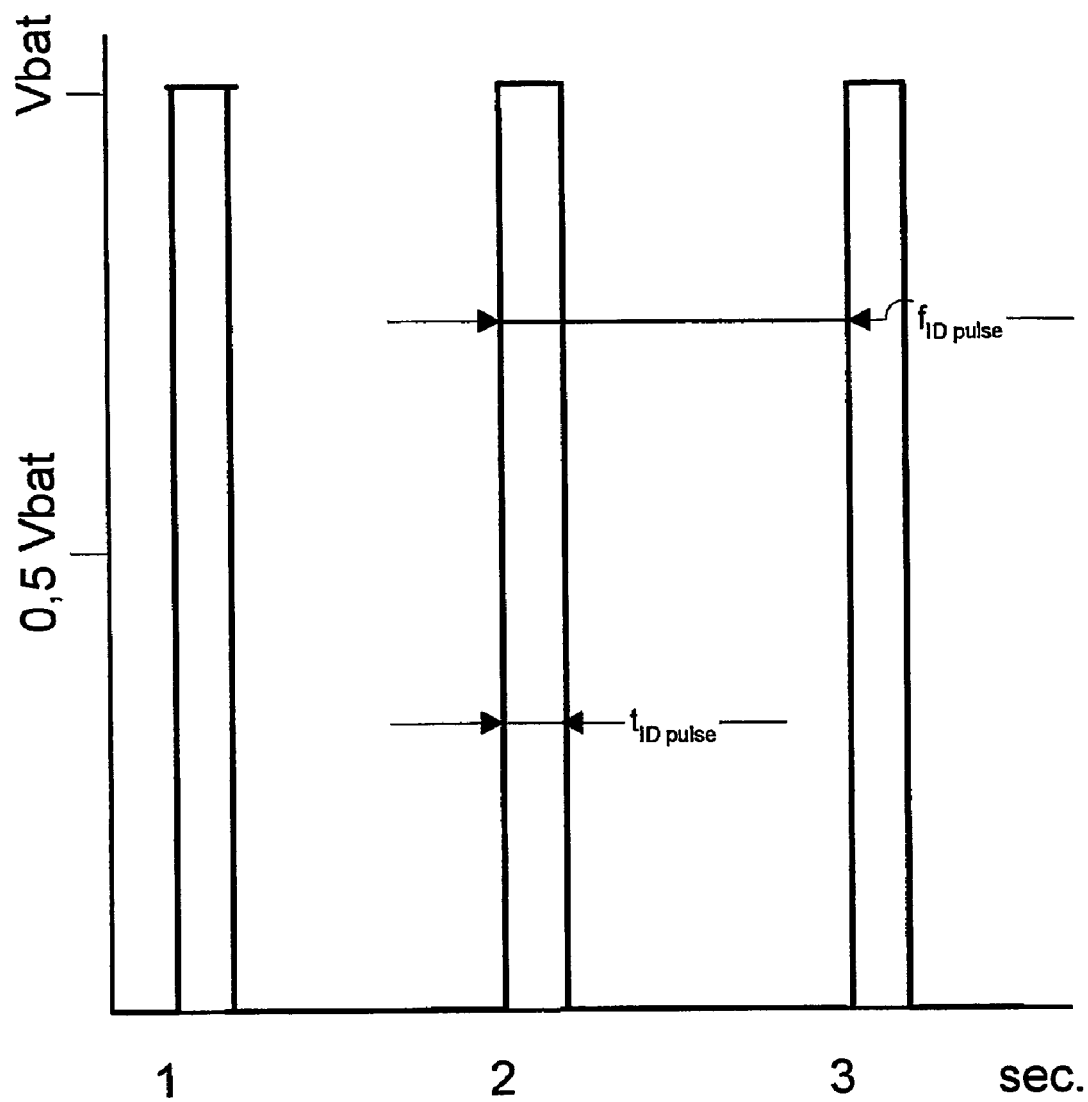
FIG. 2 schematically illustrates the periodicity of the identification sequence according to an embodiment of the present invention.

1. In a preferred embodiment, checking for an accessory device is performed at intervals of T, given as the periodicity of pulse repetition frequency $f_{ID\,pulse}$, by generating a voltage pulse on the AID pin, and measuring the voltage. Any detected voltage below a level $U_{idle\ pulse\ detect}$ shall trigger the identification. The pulse width of the identification sequence is determined by $t_{ID\ pulse}$, as will be described in further detail below. The periodicity of the identification sequence is illustrated for one embodiment in FIG. 2, and typical values for T are given in a table below. The pulse repetition frequency may be constant However, in an alternative embodiment said voltage pulse is repeatedly generating with a predetermined repetition frequency characteristic, with an adaptable frequency which is dependent on which mode the connector of the electronic device is in. In a preferred embodiment, the repetition frequency is adapted to the mode of operation for the connector, by applying a first repetition frequency in an idle mode for said connector, and by applying a second repetition frequency, higher than said first repetition frequency, in an active mode for said connector, with an attached unit. As a pure example, in the idle mode a period T, i.e. $1/f_{ID\ pulse}$, may be 2 seconds. When the active mode is entered, when an electronic unit is attached, the repetition frequency is raised, such that the period T is decreased to 1 second or even lower.

By keeping a small value for $t_{ID\ pulse}$ migration risks are minimised. When the voltage response $U_{ID}$ has increased to a level above 95% of $V_{DIG}$, $t_{ID\ Pulse}$ shall be turned of. This counts both when accessory or accessories are connected and when the system connector is Idle. Prefereably, $t_{ID\ Pulse}$ is not terminated until after a certain short time period after 95% of $V_{DIG}$ has been reached and, during which time period $U_{ID}$ must not fall below 95% of VDIG again, in order to account for disturbances. If resistive non cascadable accessories are connected the pulse shall be turned of after the maximum $t_{ID\ Pulse}$. $f_{ID\ pulse}$ can be adapted accordingly so the capacitors in the AID-unit in the accessory are discharged.

According to the invention, identification is performed continuously at the interval determined in the idle detection state. In a preferred embodiment there are three different identity types which can be identified through the AID pin:
Resistive only ID;
Dynamic Identification;
Digital Identification.
The following Interfaces can be identified:
Charger (power interface);
USB OTG Host accessory;
USB slave Accessory;
Accessory using UART Rx and Tx;
PHF/Audio Accessory (using only Analog identification);
Analog ACCS Accessory (Using only Analog identification);
Debug plug.

Figure 3:
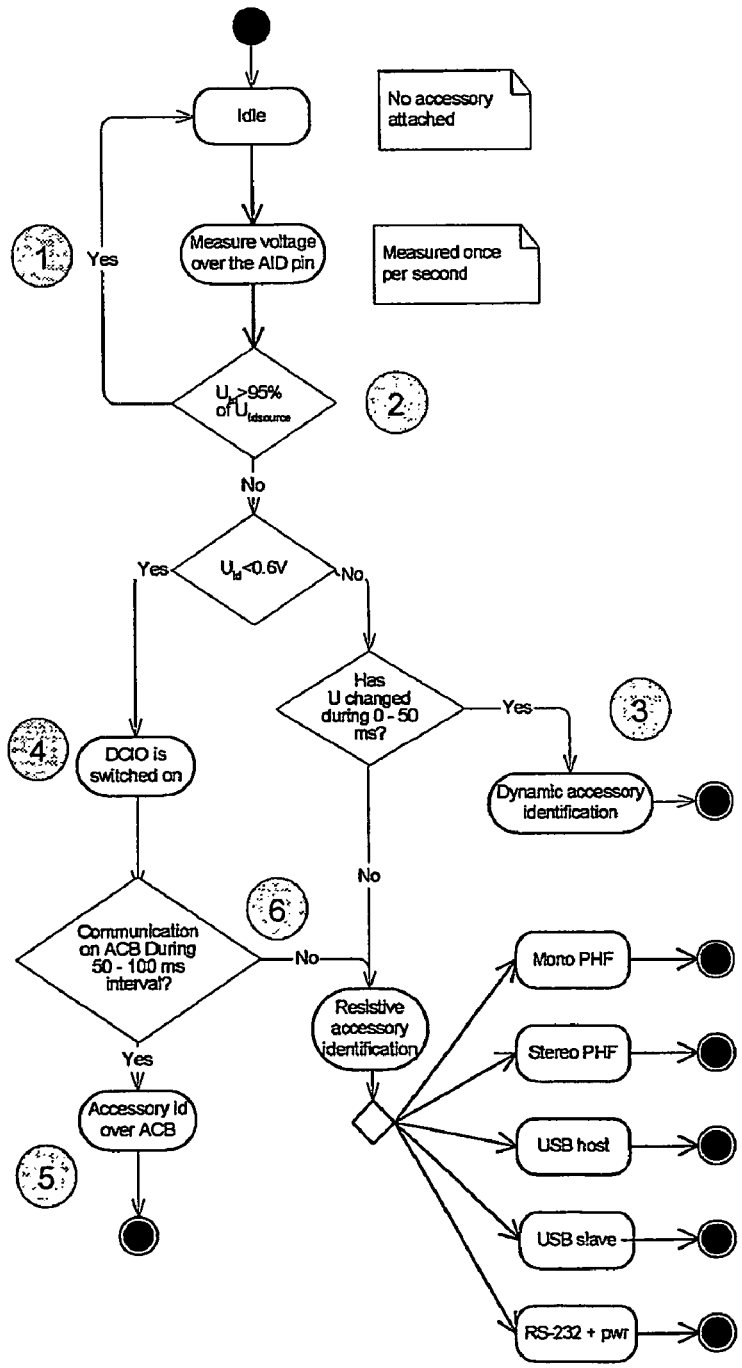
FIG. 3 shows a flow chart of the identification process according to an embodiment of the invention, and in particular the process of selecting identification method dependent on the voltage response from the accessory.

The diagram of FIG. 3 describes the flow of the idle loop and the identification of accessories attached to a terminal, in accordance with an embodiment of the invention, and reference to the indicated six different stages thereof is made below.

1) With a predetermined frequency, e.g. once per second, a voltage pulse will be generated over the AID pin in the terminal system connector. By measuring the voltage, terminal software will be able to detect if an accessory has been attached or detached.
2) If the voltage $U_{ID}$ measured is above 95% of the source voltage applied it is assumed that no accessory is attached and the terminal will return to idle state and wait until it is time to send the next Id pulse. If $U_{ID}$ is less than 95% of the source voltage, it is assumed that an accessory is attached, and identification thereof is initiated. In a first step for determining identification procedure, $U_{ID}$ is compared with a predetermined voltage threshold level, 0.6 V in the illustrated embodiment. If $U_{ID}$ is higher than the threshold level, the terminal shall continue and establish if there is any dynamic behaviour in the accessory, see step 3 below. If $U_{ID}$ is lower than the threshold level, the terminal will proceed according to step 4 below.
3) It is established that an accessory with dynamic behaviour is attached if $U_{ID}$ has changed during first time period measured from the beginning of the identification sequence, preferably a period of 50 ms from the start of the voltage pulse. The terminal is thereby set to continue with dynamic accessory identification, as described in further detail below. If, on the other hand, $U_{ID}$ remains constant during said first time period, resistive identification will be executed, which is also described in further detail below.
4) When $U_{ID}$ is less than the threshold level the terminal will activate DCIO. The terminal then holds for a second time period to allow the accessory to start communicating over the ACB, using an appropriate protocol such as EMP. Also the second time period is preferably 50 ms, i.e. running between 50 to 100 ms from the start of ID process.
5) If data communication over ACB is detected the accessory will identify itself with AT (attention)commands.
6) If no data communication over ACB is detected the accessory will identify itself with the resistive accessory identification.

Accordingly, the present invention provides an algorithm which is capable of identifying accessories by first determining type of accessory, and then establishing the accessory ID.

Identification of accessories of the three different identity types will now be described. Reference will be made to specific drawings for embodiments usable for the different types, but also to an identity table illustrated in FIG. 4. The identity table is particularly relevant to the dynamic identification, but also includes information relating to the other types of identities. According to the identification algorithm, attached accessories are analysed and allotted a hexadecimal address. This hex address preferably uniquely identifies the accessory, and by means of this address relevant data for the attached accessory can be retrieved from data memories in the terminal, e.g. for setting of audio or communication parameters. Alternatively, if the address is not known, i.e. no data is stored in the terminal relating to the allotted address, the terminal may be devised to automatically connect with a predetermined communication address over a communication network for downloading relevant accessory data to the terminal, for further processing such as setting terminal parameters.

Figure 4:
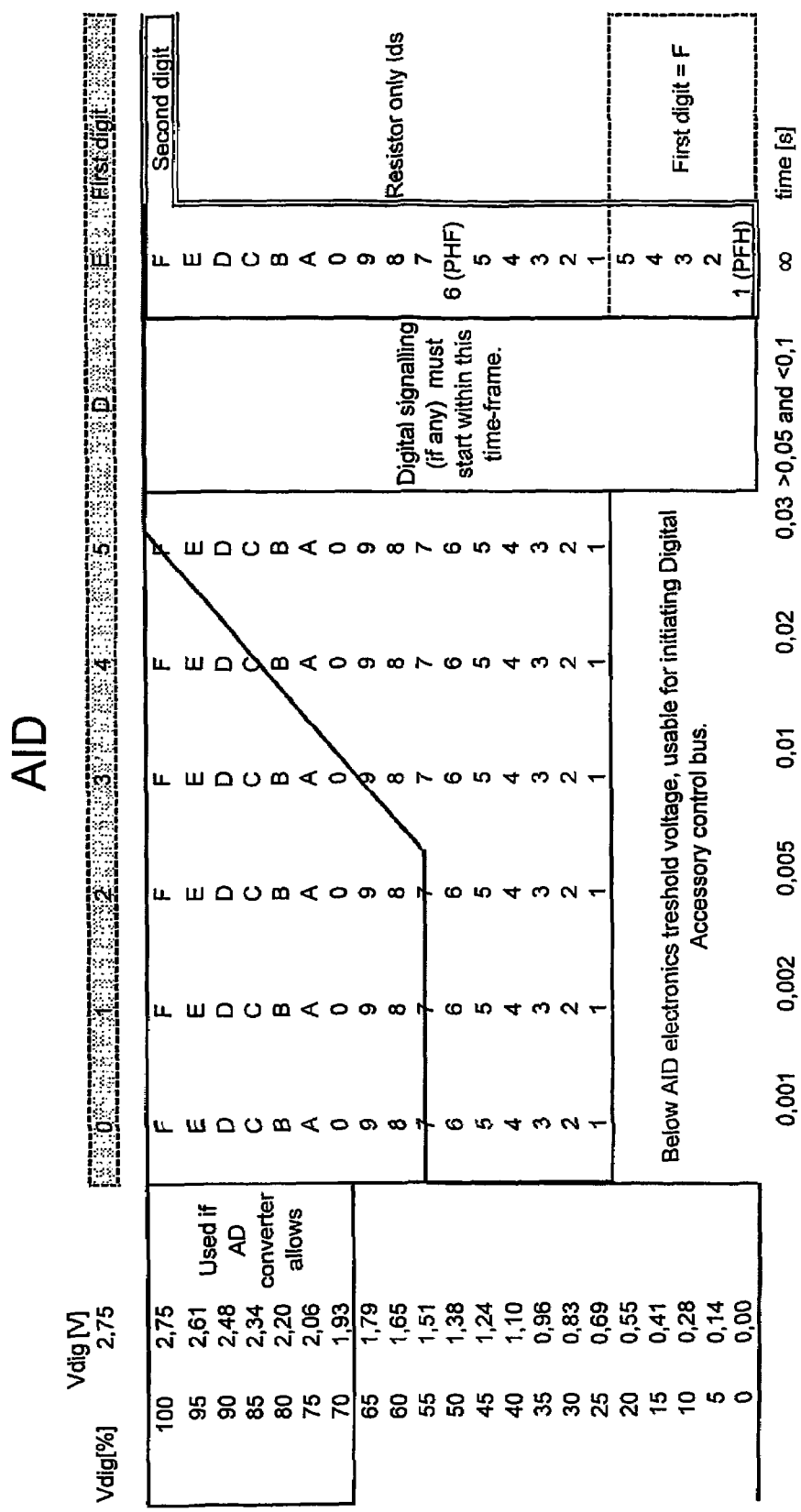
FIG. 4 illustrates a table illustrating the identification process according to one embodiment of the invention.
Figure 5:
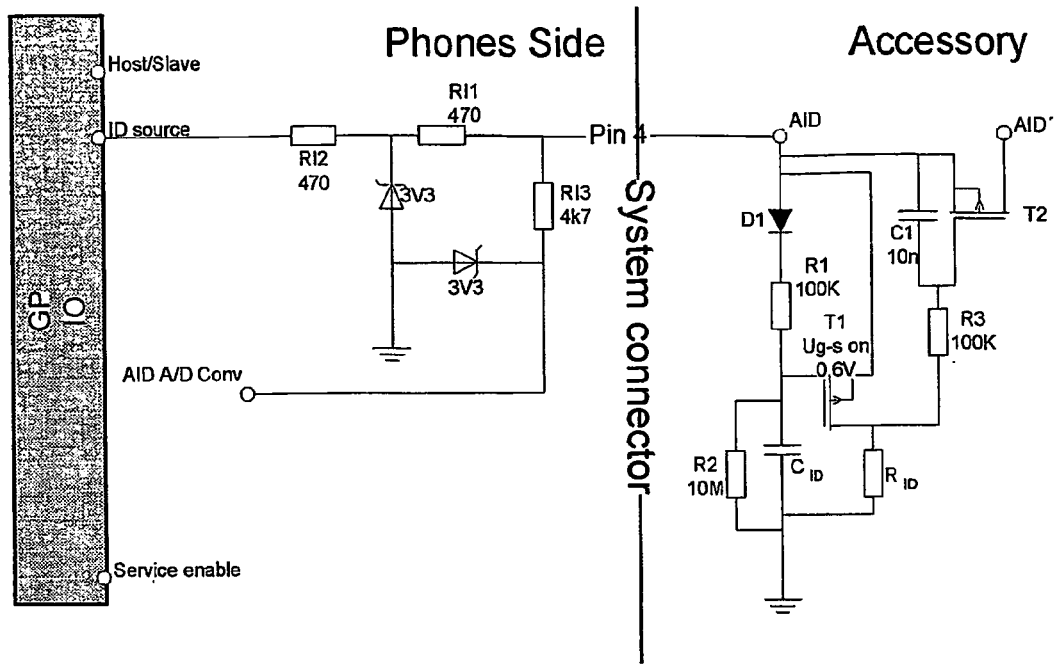
FIG. 5 schematically illustrates an interface between a terminal and an accessory, usable for dynamic identification according to an embodiment of the invention.

Dynamic identification is performed using an accessory interface which generates a dynamic voltage on the AID pin. An exemplary embodiment of such an interface is illustrated in FIG. 5, where the terminal side is indicated phone as a possible implementation. According to a preferred embodiment, circuitry of the accessory interface are devised to generate a voltage response $U_{ID}$ to the voltage pulse generated on the AID pin, which response exceeds a predetermined threshold level. As illustrated in FIG. 4 and briefly described above under point 2) above, this predetermined threshold level is, in one embodiment, 0.6 V. Furthermore, the circuitry of the accessory interface is devised to generate a dynamic voltage response, whereby the magnitude of the voltage response $U_{ID}$ will begin to rise after a certain time period.

According to this aspect of the invention, the identity of the accessory is determined by the amplitude and the duration of a stable phase of $U_{ID}$. The voltage response $U_{ID}$ will at first remain substantially stable for a certain time period, determined by the accessory circuitry, and will then begin to rise and finally reach $V_{dig}$. The dashed line in FIG. 4 illustrates one example of a response from a dynamic accessory circuit such as the one illustrated in FIG. 5. When the voltage pulse is applied to the interface according to FIG. 5, a voltage $U_{ID}$ of about 1.5 V is initially obtained in response. In this example, $U_{ID}$ remains stable for about 5 ms, which corresponds to hex number 2 as the first digit, the most significant nibble, of the accessory ID. The level 1.5 V of the stable voltage response, before the voltage rises, corresponds in the exemplary case to hex 7, according to the identity table of FIG. 4. This number is set to be the second digit, the least significant nibble, of the accessory ID. The address of the accessory is thus $27_{hex}$ in this embodiment. The stable amplitude of $U_{ID}$, setting the second digit of the accessory ID, is determined by the resistors RI 1+RI 2 in the terminal (phone) part of the interface, and $R_{ID}$ in the accessory part of the interface. The time period, setting the first digit of the accessory ID, is determined by R1 and $C_{ID}$ in the accessory part of the interface, and in particular the transistor T1.

Dynamic identification can be used in both cascadable and terminating accessories. It is also suitable for devices that need to change ID to identify a state that cannot be communicated by other means. An example of this is a USB accessory. In one embodiment, it is possible to add cascaded accessories and also identify those cascaded accessories by means of this dynamic identification process. As is evident from FIG. 5, AID' will be the connection point for the next cascaded accessory. The connection to AID' from AID using a resistor-capacitor coupling and a transistor will provide the effect that a voltage response from the second accessory will not be obtained until after the first accessory is identified, i.e. after $U_{ID}$ has begun to rise.

Figure 6:
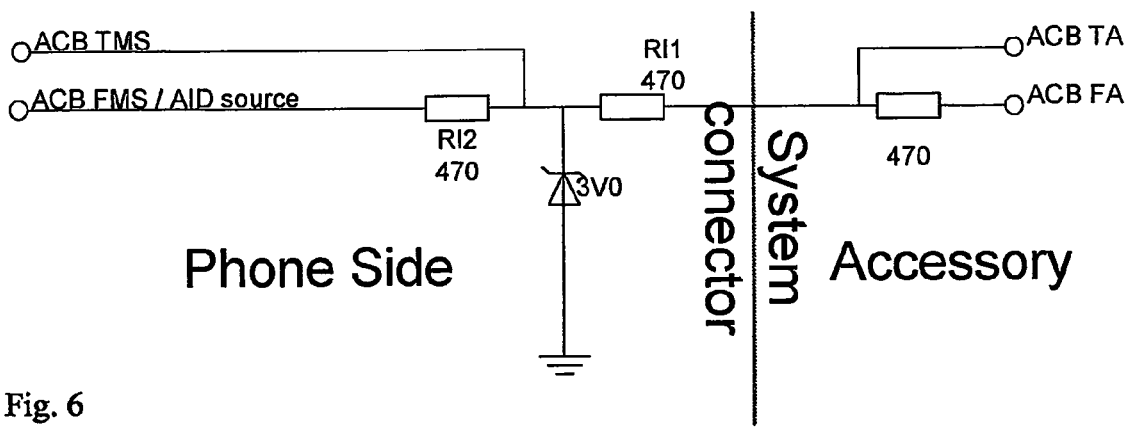
FIG. 6 schematically illustrates an interface between a terminal and an accessory, usable for digital identification according to an embodiment of the invention.

If no dynamic behaviour is revealed within a predetermined first time period from start of the voltage pulse generated to initiate the identification, the identification algorithm will assume that no dynamic accessory has been attached. This predetermined first time period may be between 10 and 100 ms, preferably 30 and 80 ms. In the illustrated preferred embodiment of FIG. 4, this time period is 50 ms. Preferably, digital signalling must then start within a second time period from the end of the first time period, e.g. within the 50 ms time period lasting from 50 ms to 100 ms after start of the voltage pulse. Furthermore, if the voltage level detected in response to the generated voltage pulse is less than the predetermined threshold level, 0.6 V in the example of FIG. 4, the identification accessory algorithm may in one embodiment be devised to automatically determine that the attached accessory is a microprocessor-controlled accessory, and thereby devised to initiate a digital accessory control bus for digital identification of the accessory. The protocol used for digital data communication is preferably EMP or RS232. Furthermore, an AT command is preferably used for identification. FIG. 6 illustrates an exemplary embodiment of an interface for digital identification according to the invention.

Figure 7:
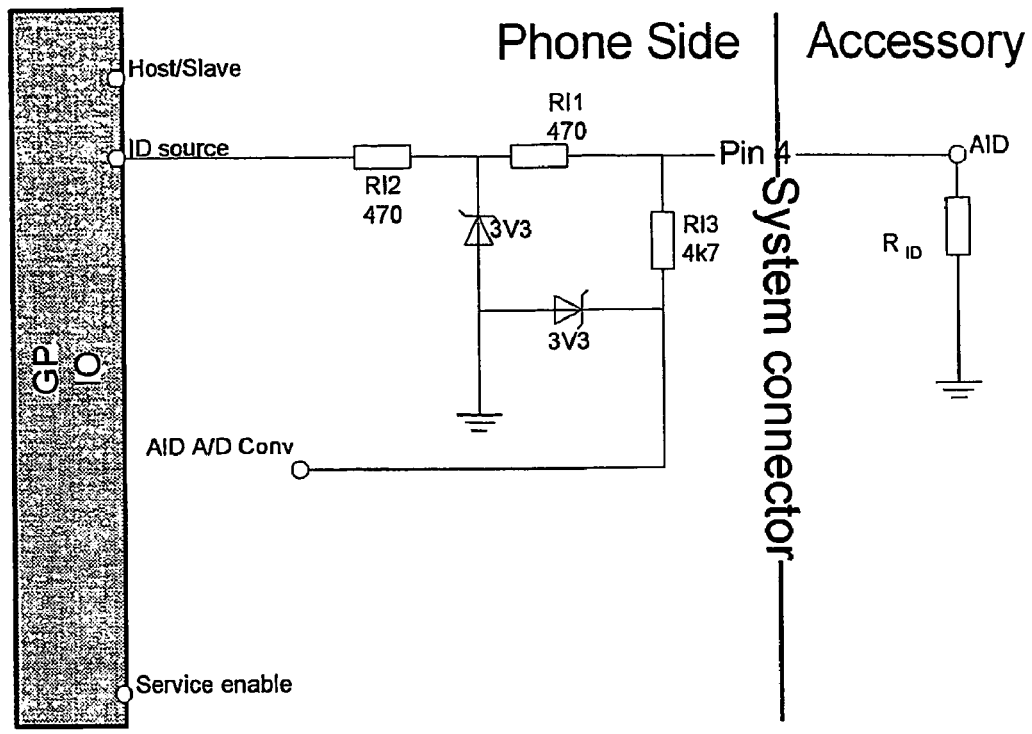
FIG. 7 schematically illustrates an interface between a terminal and an accessory, usable for resistive identification according to an embodiment of the invention.

Resistive only ID is preferably only applied for non cascadable accessories where small sizeconnector and cost effective solutions are important. Such accessories include e.g. PHF. FIG. 7 illustrates an embodiment of a connector interface for an accessory with a resistive only ID. As is evident from the right hand side of the drawing, the accessory is uniquely identified by the magnitude of the resistance of $R_{ID}$, which determines the voltage over the AID pin, in this exemplary case pin 4. The voltage level on the AID pin will therefore disclose which type of accessory is attached. According to an embodiment of the present invention, resistive identification of an attached accessory will be performed if a voltage response which is lower than a certain predetermined value is obtained, in the described example 0.95% of $U_{idsource}$, and if no dynamic response and no digital communication has been detected.

In the table of FIG. 4, representing an embodiment of the accessory identification algorithm according to the invention, the first digit of the accessory ID is determined by whether the voltage level is over or under the predetermined threshold level, in the illustrated embodiment 0.6 V. If $U_{ID}$<0.6 V, the first digit will be F, and if $U_{ID}$>0.6 V, the first digit will be E. The level of $U_{ID}$ determines the second digit from a predetermined scale. In the illustrated embodiment, addresses F1-F5 and E1-EE may be allotted to an attached accessory. Voltage level F is reserved for the System Bus Idle state.

Figure 8:
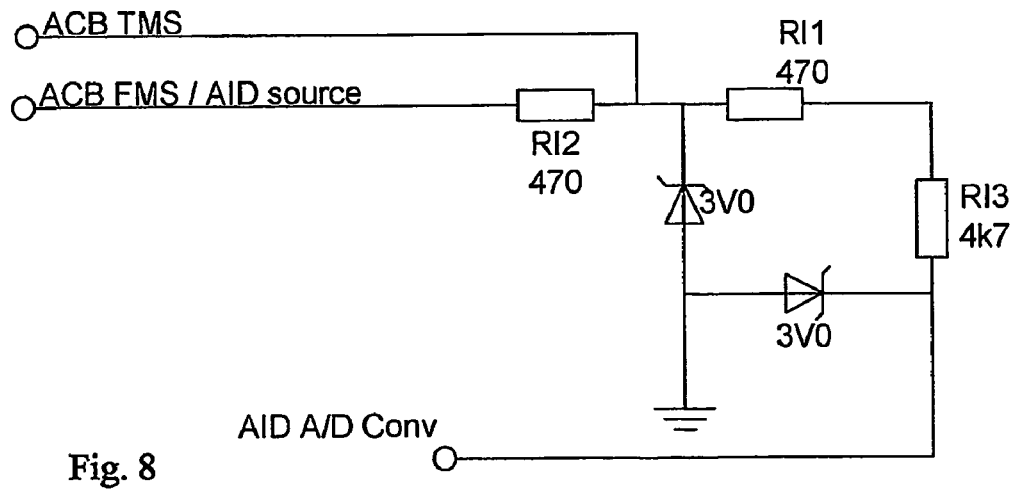
FIG. 8 schematically illustrates a circuit for a terminal system connector, usable for identifying accessories by use of digital, dynamic and resistive identification, dependent on the accessory attached, and FIG. 9 schematically illustrates an ASIC including an electronic circuit for use in an accessory for an electronic device, according to an embodiment of the invention.

In a preferred embodiment of the invention, the terminal is capable of identifying both accessories with and without data interfaces, and for the latter types, both using dynamic and resistive identification. FIG. 8 illustrates an exemplary circuitry for such a terminal connector circuitry. Furthermore, typical usable values and selectable ranges of parameter values are given in the table below:

| Parameter | Min | Typical | Max | Unit |
|---|---|---|---|---|
| T for $f_{ID\ pulse}$ | 0.5 | | 2 | s |
| $t_{ID\ pulse}$ | 2 | | | ms |
| $V_{DIG}$ | 2.65 | 2.75 | 2.85 | V |

The description above refers mainly to the detection and identification modes of the accessory identification algorithm according to the invention. The active state, entered once identification is fulfilled, is maintained as long as the accessory is detected. Detection is performed by the identification procedure. The accessory is considered attached and or active as long as the accessory can be identified repeatedly.

The accessory is considered detached when the accessory no longer can be identified. The accessory identification algorithm then returns to idle/detection mode.

Figure 9:
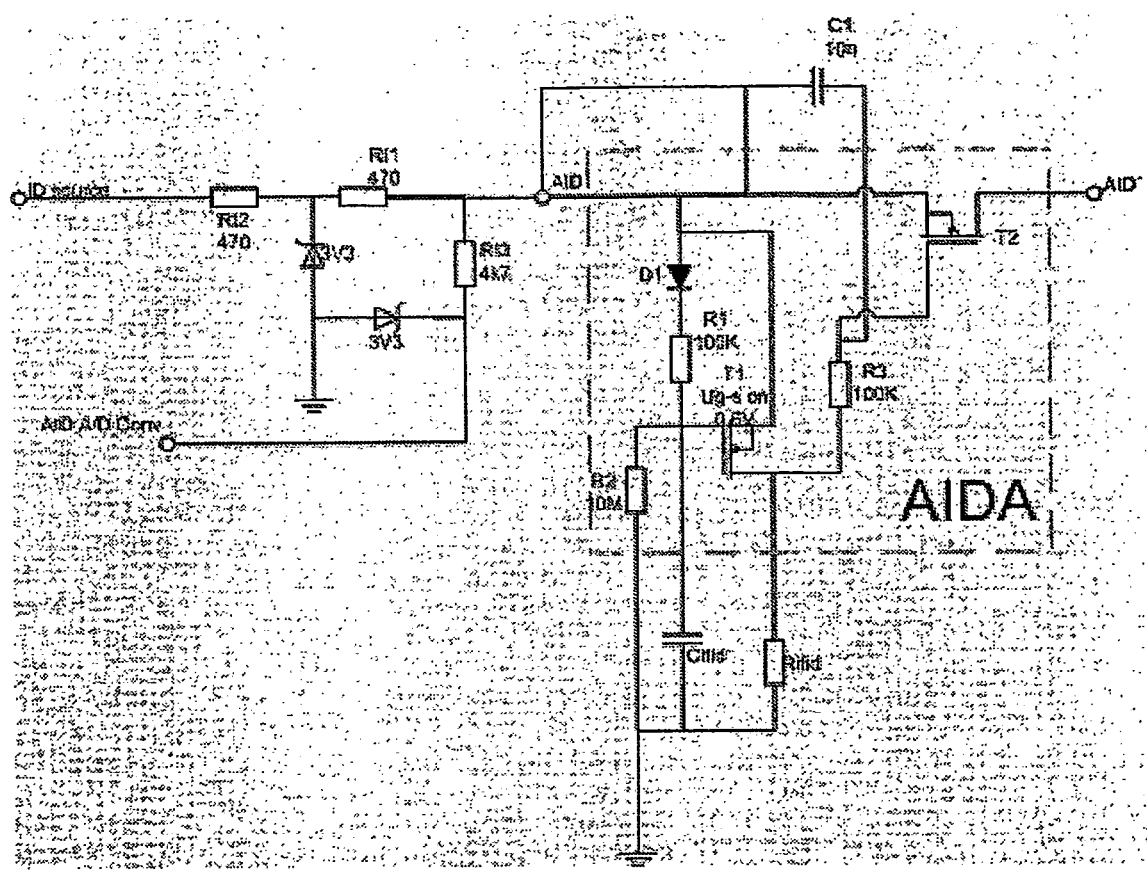

FIG. 9 illustrates a preferred embodiment of a circuit for an electronic unit, implemented on an ASIC, indicated as AIDA, Accessory Identification ASIC, by the dashed line. Of particular importance for the ASIC is that it includes transistor T1. When current is supplied from ID source over the electronic circuit of the electronic unit, transistor T1 relays current to $R_{ifid}$ ($R_{ID}$ in FIG. 5). During the substantially stable period from the beginning of the voltage pulse from the electronic device, the magnitude of $R_{ifid}$ determines the voltage response on point AID in FIG. 9, by voltage division with R11 in the electronic device. A typical range for the resistance of $R_{ifid}$ is 0-1500 ohm, this magnitude determining one nibble of the identity or address of the electronic device as previously noted. The resistance difference between different $R_{ifid}$ may be just a couple of ohms for low values, and e.g. a larger difference for larger resistance values. An example of a set of distinguishable resistance values for $R_{ifid}$ is 0, 2, 3.6, 8.2, 130, 300, 510, 820 and 1300 ohm.

As is evident from FIG. 5, the interface between electronic device to the left, and electronic unit to the right, is electrically located at point AID. As the capacitor $C_{ifid}$ ($C_{ID}$ in FIG. 5) is charged, the impedance of the electronic unit will begin to rise, and the voltage division will eventually be essentially determined by the magnitude of R2. The time period during which the voltage is substantially stable, is determined by $C_{ifid}$ and in particular $U_{g-s}$ of T1. A typical range for the capacity of $C_{ifid}$ is 1-220 nF.

The application of the electronic circuit of the electronic unit, at least including the transistor T1 as exemplified in FIG. 9, solves problems that would otherwise occur if the electronics were to be built entirely by discrete components. The ASIC embodiment saves space when implemented in accessories. Furthermore, it also limits variations due to different $U_{g-s}$ in transistors T1 which could be chosen in different applications, whereby voltage and in particular time resolution would be increased. Thereby the identification grid as illustrated in the table of FIG. 4 is increased, with smaller voltage and time steps. This will in turn make it possible to identify more accessories and improve repeatability. Furthermore, less board space will have to be used.

The principles of the present invention have been described in the foregoing by examples of embodiments or modes of operations. However, the invention is not limited to the particular embodiments discussed above, which should be regarded as illustrative rather than restrictive, and it should be appreciated that variations may be made in those embodiments by persons skilled in the art, without departing from the scope of the present invention as defined by the appended claims.

The invention claimed is:

1. Method for identifying a communication interface of an electronic unit attached to a connector of an electronic device, comprising the steps of:
   generating a voltage pulse in said device on a pin of said connector;
   measuring the voltage response to the voltage pulse generated on said pin, as affected by a load in said unit;
   comparing the measured voltage response with predetermined voltage criteria; and
   performing communication interface identification of said unit dependent on said comparison.

2. The method as recited in claim 1, wherein said step of performing identification is preceded by the step of:
   selecting identification process dependent on the value of said measured voltage.

3. The method as recited in claim 1, wherein said step of performing identification is preceded by the step of:
   selecting identification process dependent on predetermined timing criteria.

4. The method as recited in claim 1, wherein said step of performing identification comprises the steps of:
   measuring dynamic behaviour of said voltage level as affected by the load in said unit; and
   allotting an identification address to said unit dependent on said dynamic behaviour.

5. The method as recited in claim 4, wherein said step of measuring dynamic behaviour comprises the steps of:
   measuring a time period during which said voltage holds a stable level; and
   measuring the value of said stable voltage level.

6. The method as recited in claim 5, wherein said identification address is determined by the length of said time period and the magnitude of said voltage level value.

7. The method as recited in claim 5, wherein said identification address comprises two nibbles, one address nibble being selected dependent on the length of said time period and one other nibble being selected dependent on the magnitude of said voltage level value.

8. The method as recited in claim 5, wherein said identification address is a two nibble hexadecimal number which is set dependent on predetermined time and voltage ranges.

9. The method as recited in claim 7, wherein a predetermined number is selected for said one address nibble if the length of said time period exceeds a predetermined maximum time period.

10. The method as recited in claim 2, further comprising the step of:
    monitoring a control bus of said connector for a predetermined time period, dependent on if said measured voltage level meets predetermined criteria for digital attachable units.

11. The method as recited in claim 10, wherein said predetermined criteria for digital attachable units is a maximum threshold voltage level.

12. The method as recited in claim 10, further comprising the step of:
    in the event of data communication being detected over said control bus during said time period, performing digital identification of said unit.

13. The method as recited in claim 10, further comprising the step of:
    in the event of no data communication being detected over said control bus during said time period, allotting an identification address comprising two nibbles to said unit, one address nibble for which a predetermined number is selected, and one other nibble for which a number is selected dependent on the magnitude of said voltage level value.

14. The method as recited in claim 1, further comprising the step of:
    repeatedly generating said voltage pulse with a predetermined repetition frequency.

15. The method as recited in claim 1, further comprising the steps of:
    repeatedly generating said voltage pulse with a predetermined repetition frequency characteristic; and
    adapting said repetition frequency to a mode of operation for said connector, by applying a first repetition frequency in an idle mode for said connector; and by applying a second repetition frequency, higher than said first repetition frequency, in an active mode for said connector, with an attached unit.

16. The method as recited in claim 1, wherein said step of performing identification includes the step of allotting the unit an identification address, and the method further comprises the step of:
    accessing a data memory using said identification address for retrieving operational data associated with said electronic unit.

17. The method as recited in claim 16, wherein said data memory is located in said electronic device.

18. The method as recited in claim 16, wherein said data memory is located in said electronic unit.

19. The method as recited in claim 16, further comprising the steps of:
    establishing a connection over a communication network for accessing said memory; and
    downloading operational data relating to said electronic unit to said electronic device.

20. The method as recited in claim 16, further comprising the step of:
    making adjustments dependent on the attached electronic unit to said electronic device, based on said operational data.

21. The method as recited claim 1, wherein said electronic device is a radio communication terminal, and said electronic unit is an accessory which is attachable to said radio communication terminal.

22. The method as recited claim 1, wherein said identity is representative of a class of electronic units.

23. The method as recited claim 1, wherein said identity is unique for said electronic unit.

24. Computer program product, comprising computer program code stored in memory means, which is executable by means of a micro processor in an electronic device and that is configured to perform the steps according to claim 1.

25. An identification system comprising:
an electronic unit having a communication interface comprising a first connector;
an electronic device comprising a system connector, wherein the first connector is configured to be attachable to the system connector, wherein the electronic device comprises a voltage pulse generator connected to an identification pin of the system connector;
a first pin of the first connector, is configured to be coupled to the identification pin upon attachment of the first connector to the system connector, and is coupled to an electronic circuit in the electronic unit;
the electronic circuit has an electric load which is selected to represent an identity for said communication interface; and
the electronic device comprises identification means for measuring a voltage response from the communication interface, comparing the measured voltage with predetermined voltage criteria, and performing communication interface identification of said unit dependent on said comparison, wherein the electric load is connected between said first pin and ground, and the identification means are connected to measure the voltage response on the identification pin.

26. The system as recited in claim 25, wherein said circuit comprises a resistive component, wherein said identity is dependent on the ohmic resistance of said resistive component.

27. The system as recited in claim 25, wherein said circuit comprises a capacitive component, wherein said identity is dependent on the dynamics of said circuit.

28. The system as recited in claim 26, wherein said circuit is configured to generate a dynamic load when subjected to a voltage from an attached electronic device, the load holds a substantially stable voltage level over said connector for a predetermined time period and then triggers said voltage to rise.

29. The system as recited in claim 28, wherein said identity is determined by the duration of said predetermined time period and said voltage level.

30. The system as recited in claim 25, wherein said electronic unit comprises a second connector to which said circuit is connected, and to which second connector an additional electronic unit electronic unit is configured to be cascadably attached.

31. The system as recited in claim 25, wherein said electronic unit is an accessory which is attachable to an electronic device in the form of a radio communication terminal.

32. The system as recited in claim 25, wherein said identity is representative of a class of electronic units, 33. The system as recited in claim 25, wherein said identity is unique for said electronic unit.

34. An electronic circuit, for use in an electronic unit of a system as recited in claim 25, wherein said circuit is connected between one first connector pin and ground, and comprises an electric load configured to generate a dynamic voltage response on said first connector pin when subjected to a voltage pulse on said pin from an electronic device attached to the electronic unit, wherein the dynamic behaviour of the voltage response determined by the electric load is representative of the identity of a communication interface of said electronic unit.

35. The electronic circuit as recited in claim 34, wherein said circuit comprises a transistor, a resistive component, and an RC component, wherein said transistor controls current from the electronic device to the resistive component which initially generates a substantially stable voltage level for a predetermined time period and then said RC circuit triggers said voltage to rise.

36. The electronic circuit as recited in claim 35, wherein said time period is dependent on the characteristics of said transistor, and said transistor is contained on an ASIC.

* * * * *